United States Patent [19]

Baxter

[11] 4,051,524
[45] Sept. 27, 1977

[54] SEQUENTIAL VIDEO SWITCHING SYSTEM

[75] Inventor: Larry K. Baxter, Lexington, Mass.

[73] Assignee: QSI Systems, Inc., West Newton, Mass.

[21] Appl. No.: 684,145

[22] Filed: May 7, 1976

Related U.S. Application Data

[63] Continuation of Ser. No. 535,989, Jan. 24, 1975.

[51] Int. Cl.² ............................................. H04M 7/18
[52] U.S. Cl. ............................. 358/108; 358/125; 358/127; 358/192
[58] Field of Search ................. 178/DIG. 1, DIG. 6, 178/DIG. 13, DIG. 21, DIG. 38, DIG. 6.8; 358/108, 125, 127, 192

[56] References Cited

U.S. PATENT DOCUMENTS

| 3,686,434 | 8/1972 | Lemelsom | 358/108 |
| 3,935,380 | 1/1976 | Contta | 358/108 |

*Primary Examiner*—Robert L. Griffin
*Assistant Examiner*—Edward L. Coles
*Attorney, Agent, or Firm*—Cesari and McKenna

[57] ABSTRACT

A video surveillance system having a plurality of video cameras and means for reproducing the scenes viewed by a selected by one of the cameras. A switch selectively connects the cameras to the reproducing means. A counter generates a sequence of signals wherein each signal corresponds to one of the cameras. The counter signals are applied to the switch to select the corresponding camera and apply its output to the reproducing means. The counter signals are also applied to a character generator which generates characters identifying the selected camera for display at a selected location in the reproduced scene.

5 Claims, 3 Drawing Figures

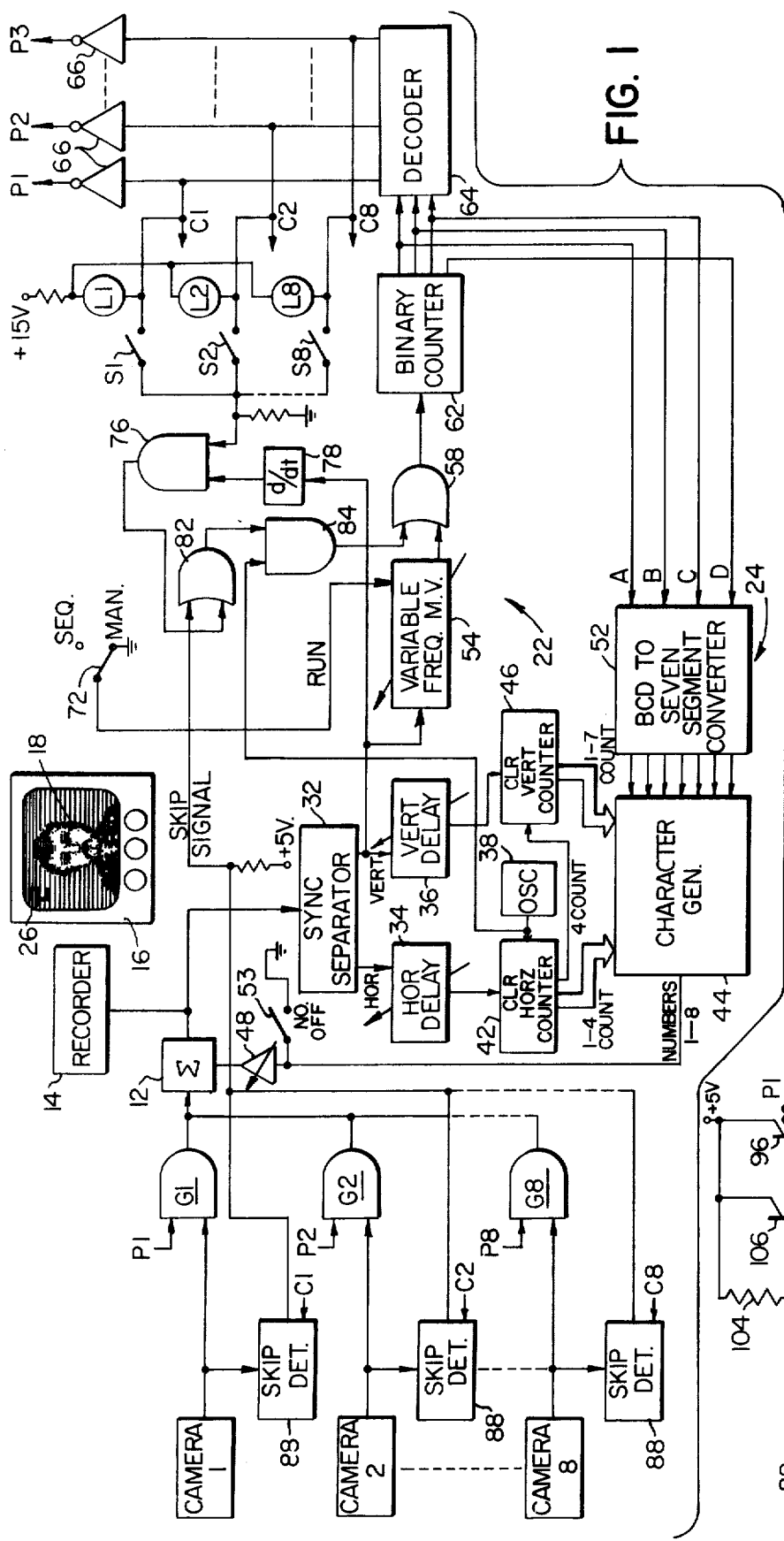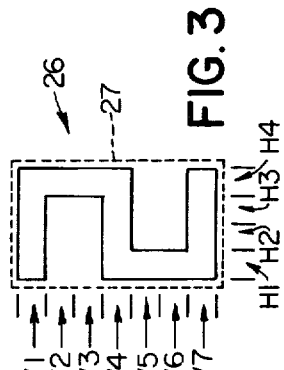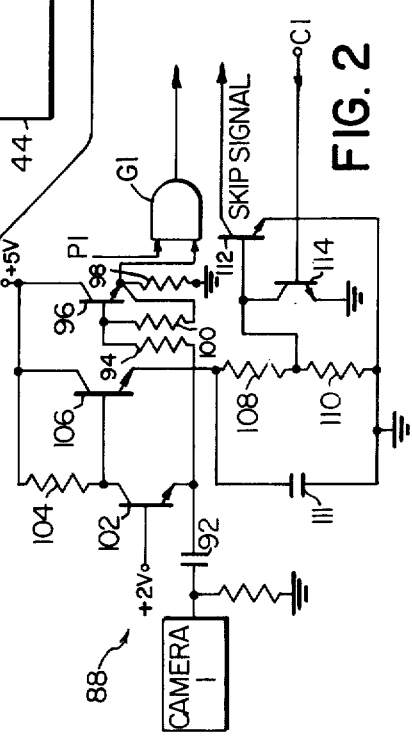

4,051,524

SEQUENTIAL VIDEO SWITCHING SYSTEM

This is a continuation of application Ser. No. 535,989 filed Jan. 24, 1975.

BACKGROUND OF THE INVENTION

This invention relates to the recording or display of information from a multiplicity of television cameras positioned at different locations. It relates more particularly to a system for switching between the camera outputs so that the occurrences at the different locations can all be monitored quasi-continuously.

This invention is primarily directed to those applications where pictures of events occurring at many different locations are recorded on video tape for immediate or later display on a television screen. For example, many stores and banks position television cameras at several critical locations such as teller's cages, vault areas, check cashing windows, etc. Pictures from all of these locations are displayed on television monitors or recorded on video tape for later display in the event they are to be subsequently reviewed. Thus, if there is a holdup or a bad check is passed, the recorded pictures may help identify the culprits.

In some installations, the cameras operate independently, each having its own television recorder or monitor. Since several viewing locations are involved, such systems become quite expensive because of the required redundancy of recorders and other equipment.

There do exist some systems which provide automatic switching between camera outputs. However, such systems are disadvantaged for several reasons. In some cases, the switching causes the recorded pictures to roll or jitter, thereby lessening the effective duration of the view at each location. Also, in other systems, it is not immediately apparent from any given recorded picture from which camera it originated. Thus, if a particular picture depicts a holdup, for example, valuable time may be lost determining at which viewing location the holdup is progressing.

Finally, some prior systems tend to be quite complex and expensive and thus require an undue amount of maintenance which increases down time and reduces their value for security purposes.

SUMMARY OF THE INVENTION

Accordingly, the present invention aims to provide a video sequential switching system which switches the video signals from a large number of television cameras to a recorder without spoiling the quality of the individual recorded pictures.

Another object of the invention is to provide a system of this type which automatically displays and records with each picture the identity of the camera which generated the picture.

A further object of the invention is to provide a video sequential switching system which permits a wide selection of picture duration time and repetition rate for the individual cameras.

Yet another object of the invention is to provide a switching system which has variable dwell time and automatically bypasses unused cameras, thereby automatically increasing the repetition rate of the pictures from the on-line cameras.

A more specific object of the invention is to provide a switching system of this type which is less complex and less costly than prior apparatus of this general type and which is reliable and requires a minimum amount of maintenance.

Other objects will in part be obvious and will in part appear hereinafter. The invention accordingly comprises the features of construction, combination of elements and arrangement of parts which will be exemplified in the construction hereinafter set forth and the scope of the invention will be indicated in the claims.

In general, the present system applies the video signals from a plurality of television cameras in sequence to a video tape recorder and an associated television monitor. Thus, the events taking place at the different locations are permanently recorded and may be played back on the monitor at any time, as circumstances warrant. Normally the cameras run continuously and the system operates untended for many hours before tape replacement is required. Therefore, virtually continuous surveillance can be maintained over a given installation.

The vertical sync signal from each camera synchronizes switching to the next camera in the sequence so that switching always occurs during the vertical retrace interval of the picture then being recorded. Consequently, switching from one camera to the next does not cause the recorded picture to jitter, roll or otherwise impair the quality of the picture.

Provision is made for adjusting the dwell time, i.e., length of time during which the output of each camera in the sequence is recorded. Typically, the dwell time can be varied from 1 to 30 seconds to suit the needs of the particular user. Under some circumstances, although the installation has a full complement of television cameras, not all of them are operating at any given time. For example, in a bank, some of the teller's cages may be unused. The present system detects the absence of a video signal from any of these unused cameras in the sequence and automatically advances rapidly to the next active camera in the sequence. Thus, there is no dwell time at unused locations, so that a maximum amount of time is spent recording pictures at locations that do require surveillance. This feature enables the system to make the most efficient use of the video recording tape and increases the probability of a crucial incident being recorded.

In order to speed identification and spot potential trouble as quickly as possible, the composite video signals being displayed and/or recorded include components which identify the sources of the pictures. Typically each recorded picture includes a character such as a number which identifies the camera location of that particular picture. To accomplish this, a character generator controlled by the vertical and horizontal sync signal components of the composite video signal generates a series of signals that superimpose a camera-identifying numeral on the picture. Furthermore, provision is made for adjustably delaying the application of the sync signals so that the character can be positioned anywhere on the recorded picture.

All of the foregoing features make the present system a highly useful surveillance tool. Yet, the system is not unduly complex and is made of conventional, solid-state digital components. Consequently, it should be reliable, relatively inexpensive, have a long life, and require little maintenance.

BRIEF DESCRIPTION OF THE DRAWING

For a fuller understanding of the nature and objects of the invention, reference should be had to the following detailed description taken in connection with the accompanying drawing, in which:

FIG. 1 is a block diagram showing video picture generating apparatus employing a video sequential switching system made in accordance with this invention;

FIG. 2 is a schematic diagram showing part of the FIG. 1 system in greater detail; and FIG. 3 is a diagram illustrating the formation of a bar character of the FIG. 1 system.

DESCRIPTION OF THE PREFERRED EMBODIMENT

Turning now to FIG. 1 of the drawing, a series of eight television cameras, 1–8, are set up to monitor eight different locations in a surveillance operation in a bank, for example. These cameras generate composite video signals which are applied by a set of gates, G1–G8, to a summing network 12. The output of network 12 is applied to a video tape recorder 14 and to a conventional television monitor 16. Recorder 14 is a standard one having an instant playback capability and its output can be displayed on the monitor 16 if the recorded pictures are to be viewed subsequently.

Gates G1 to G8 are enabled in sequence by signals P1 to P8 from a sequencing section indicated generally at 22. The video signals from the cameras 1–8 are thus applied in continuous rotation to recorder 14 and monitor 16.

Preferably, the system includes provision for superimposing on the video signals from the cameras additional signals reflecting the instantaneous time and date, so that each recorded picture can be pinpointed exactly in time. A particularly suitable arrangement of that type is disclosed in my copending application Ser. No. 396,797 filed Sept. 13, 1973 titled TV DISPLAY SYSTEM, now U.S. Pat. No. 3,898,644.

In order to indicate the camera location of each recorded picture, the present system includes a character generating section, indicated generally at 24, which generates character signals which are summed with the composite video signals in the summing network 12. Thus, the display on monitor 16 includes a character 26 which identifies the camera location where the picture 18 on the monitor 16 originates.

In the illustrated example, the display of the numeral "2" indicates that the picture 18 was taken at the location of camera 2. Thus, if the viewer sees something amiss on the monitor 16, he can immediately pinpoint the location of the potential trouble and take the necessary steps. Furthermore, when the picture information recorded on tape is used later, for example, as evidence, the source-indicating character displayed with each picture eliminates any possibility of conflict over the camera angle or the position of the subject of the picture.

By appropriately manipulating various front panel controls on the switching system, one can control the intensity of character 26, relative to picture 18, as well as its position on the picture. Impairment of the picture quality by the presence of the character can thereby be avoided. Other front panel controls allow the user to regulate the dwell time at each camera location in the sequence to best suit the prevailing conditions. Also, the system can be placed in a manual mode to select the output of any camera continuously by means of a series of eight front panel switches S1 to S8. The operation of these various panel controls and switches will be described hereinafter in conjunction with the various circuit elements they control.

Referring to FIG. 3, a conventional raster-scan character generating arrangement is used to generate the characters 26 in the form of a seven-bar-segment display. Each character 26 is formed in a 4 × 7 matrix or envelope 27 which is four columns wide and seven lines high. Each of the horizontal display lines of the character corresponds to two consecutive scan lines of the television raster. The video display first sweeps across the display line 1 to form the top portion of the character and in succession it sweeps across lines 2 to 7 to complete the character display. The times during which the electron beam traces the respective lines are designated V1 to V7.

Similarly, the system has time divisions corresponding to the horizontal movement of the electron beam along each of the display lines. These divisions are indicated as horizontal times H1 to H4. Thus each horizontal and vertical element in the envelope 27 is defined by a pair of horizontal and vertical time intervals H and V.

Referring again to FIG. 1, the composite video signals from the cameras are fed to a sync separator 32 in character generating section 24 to extract the horizontal and vertical sync pulses. These pulses are coupled to variable horizontal and vertical delay units 34 and 36. These can be conventional one-shot multivibrators with variable time constants.

A BCD code for each camera-identifying character 26, from a counter-register 62, is applied to a character generator 44 by way of a BCD-to-seven segment converter 52. Generator 44 combines the output of converter 52 with horizontal timing signals H1 and H4 (corresponding to intervals H1 to H4) and vertical timing signals V1–V7 (corresponding to intervals V1 to V7) to provide video character signals that are applied to the summing circuit 12. The signals H1–H4 come from a counter 42 that counts pulses from an oscillator 38, which in the present example, has a frequency of 2.1 MHz. The counter 42 is reset and enabled to count upon receipt of the delayed horizontal sync pulse from the horizontal delay unit 34. The vertical timing signals V1 to V7 come from a count-of-seven vertical counter 46. Counter 46 is incremented by the output of counter 42 after the horizontal intervals have passed. It is cleared and enabled to count by the delayed vertical sync pulse from the vertical delay unit 36.

An intensity-adjusting variable amplifier 48 is connected between the output terminal of character generator 44 and ground. A front panel knob allows the user to adjust amplifier 48 to raise or lower the signal level applied to network 12 from generator 44 and thereby control the intensity of the character 26. Also, a front panel switch 53 is connected so that the signal from generator 44 can be grounded, thereby eliminating the character 26 from the display entirely.

Sequencing section 22, which accomplishes the sequential switching between cameras 1 to 8, includes an oscillator in the form of a conventional variable frequency, free running multivibrator 54. The multivibrator 54 is synchronized by the vertical sync pulses from sync separator 32 so that its output pulses come during vertical retrace intervals. The output of the multivibrator 54 is applied via an OR circuit 58 to a binary counter 62 which responds to the trailing edges of these pulses.

The contents of counter 62 appear on four output lines A to D which provide the four inputs to the converter 52 just described above. Three of these lines, A to C, are also connected to a decoder 64 having eight output lines C1-C8 that provide correspondingly designated ground-assertion-level selection signals C1-C8. A series of eight inverting amplifiers 66 convert the C1-C8 signals to positive-assertion-level signals P1-P8 that enable the gates G1-G8 controlling the connections between cameras 1-8 and the summing network 12.

Thus, in response to the output of the multivibrator 54, the C1-C8 outputs from decoder 64 enable the gates G1-G8 in sequence so that the outputs of cameras 1-8 are selected in sequence. The on time or dwell time of each camera is determined by the frequency of multivibrator 54, which is adjustable by means of a front panel knob that controls a frequency determining element in a conventional manner. In practice, the multivibrator frequency is adjustable so as to provide a camera dwell range of from one to thirty seconds.

Still referring to FIG. 1, the illustrated system has two modes of operation, namely, a SEQUENCE mode in which the system automatically cycles among the cameras 1-8 and a MANUAL mode in which the user can select and record any one of the eight cameras for as long as he wishes. The mode of operation is determined by the setting of a two-position MODE SELECT switch 72 connected to the multivibrator 54.

When switch 72 is in its SEQUENCE position, the multivibrator 54 output increments counter 62 as described previously. On the other hand, when switch 72 is in its MANUAL position, it grounds an appropriate terminal of the multivibrator 54 and the output from multivibrator thereupon ceases.

The signals C1-C8 from decoder 64 are applied to a series of eight manual selection switches S1-S8, these switches, in turn, being connected together to a gate 76. The other input to gate 76 is developed by a differentiator 78 which differentiates the vertical sync pulses from sync separator 32. The output of gate 76 is passed by an OR circuit 82 to be one input of a second gate 84. The other input to gate 84 consists of pulses from oscillator 38. The output of gate 84 is an input to OR circuit 58.

Switches S1-S8 are conventional momentary pushbutton switches. When actuated, they are held down long enough for the operation of the camera-selection circuitry about to be described. This requires only a few milliseconds.

Accordingly, when a manual selection switch, say switch S2, is actuated, if a camera other than the selected camera 2 is at that time connected to the summing circuit 12, the actuated switch applies an enabling signal immediately to gate 76. The very next vertical sync pulse from separator 32 is thus passed by gate 76 to OR circuit 82 to enable gate 84 so that the oscillator 38 pulses are applied to OR circuit 58 to rapidly increment counter 62. The counter 62 continues counting until the decoder 64 selects the desired camera, i.e. camera 2, at which time a ground-level C2 output signal from the decoder disables gate 76. This, in turn, disables gate 84, thereby cutting off the oscillator 38 pulses from counter 62. At this point, a P2 signal is being applied to gate G2, so that the output of camera 2 is being passed through to the recorder 14 and monitor 16. Also, the count in counter 62 is applied to converter 52 so that the character generator 44 causes insertion of the numeral "2" into the recorded and displayed pictures.

Because of the high frequency of oscillator 38, e.g. 2.1 mHz, all of the foregoing steps, from the beginning of the vertical sync pulse to the connection of the selected camera 2 to the summing circuit 12, take place well within the duration of the sync pulse, i.e. during vertical retrace time of the picture, thereby avoiding "rollover" due to the switching. In this connection, it should be noted that the time constant of the differentiator 78 should be sufficiently long, e.g. 50 $\mu$sec., to ensure passage of the required number of oscillator 38 pulses to the counter 62.

If, when a manual selection switch is actuated, the corresponding camera is already connected to the summing circuit 12, the switch output will be at ground level and the gate 76 will remain disabled.

If the operator should now actuate another manual selection switch, say, switch S8, the next vertical sync pulse will enable gate 84. Resultantly, oscillator 38 pulses will rapidly advance counter 62 until decoder 64 generates a C8 signal, causing the disablement of gate 84. Also, the C8 signal is inverted and applied as a P8 signal to gate G8, so that the output of camera 8 is now recorded and displayed on monitor 16.

When the system is placed in its SEQUENCE mode by means of switch 72, it automatically skips unused cameras or cameras whose output signals are so weak that they produce no useful pictures. More particularly, the video signals from cameras 1-8 are applied to a series of identical skip detectors 88 whose outputs are gated by the decoder 64 output signals C1-C8. When the video signal from one of the cameras is unduly weak or entirely absent, the detector 88 associated with that camera generates a SKIP signal when gated and this signal is coupled to OR circuit 82. The output of OR circuit 82, in turn, enables the gate 84 to pass oscillator 38 pulses to counter 62 until the system advances rapidly to the next camera in the sequence which is producing a normal video signal.

Accordingly, there is no delay between the usable camera signals being recorded by recorder 14. So too, there is a minimum amount of tape waste and, more importantly, no gap or break in the surveillance being conducted at the particular installation. Again, the skipping operation is completed during vertical retrace so as to avoid rollover.

FIG. 2 shows a typical skip detector 88 in greater detail. The video signal from camera 1, for example, is applied through a coupling capacitor 92 and a series resistor 94 to the base of a transistor 96. The transistor 96 is connected as an emitter-follower amplifier whose output is applied to the gate G1. This amplifier stage also includes an emitter resistor 98 and a resistor 100 connected between base and emitter.

The skip detector 88 further includes a transistor 102 whose emitter is connected to the junction between the capacitor 92 and resistor 94 and whose collector is connected to a resistor 104, which, in turn, is connected to a positive voltage source, as indicated (illustratively 5 volts). The collector of the transistor 102 is also connected to the base of a transistor 106 whose collector is connected to the positive voltage source and whose emitter is connected to one end of a voltage divider comprising a pair of resistors 108 and 110. A smoothing capacitor 111 is connected in parallel with the divider 108-110. The junction of the resistors 108 and 110 is connected to the base of a transistor 112 whose emitter is connected to ground along with the other end of the voltage divider 108-110. The collector of the transistor 112 provides the output signal of the skip detector 88.

The base of the transistor 102 is connected to a suitable source of positive voltage, e.g. 2 volts. In the absence of an input from camera 1, this maintains a DC level of about the same voltage on the right of the capacitor 92. Moreover, there is base-emitter current in the transistor 102 and a resulting collector current in that transistor, with a corresponding voltage drop across the resistor 104. The collector voltage of the transistor 102, less the base-emitter drop in the transistor 106, is applied to the voltage divider 108-110. The voltage divider reduces this voltage to a level, e.g. 0.50 volts, insufficient to cause the transistor 112 to conduct.

On the other hand, if there is a video signal from camera 1, the negative-going portions of that signal will cause the capacitor 92 to be charged essentially to the sum of the peak (negative) portions of the composite video signals and the two volts applied to the base of the transistor 102. This effectively cuts off the transistor 102 whose collector voltage increases correspondingly. This, thus, increases the voltage across the divider 108-110 so that, in the absence of an inhibiting signal discussed below, the voltage at the base of the transistor 112 is sufficient to provide conduction of this transistor, thereby essentially grounding the collector of the transistor 112.

With further reference to FIG. 2, the collector of a gating transistor 114 is connected to the base of the transistor 112 so that when the camera 1 is not selected, a positive voltage is applied to the base of the transistor 114 thereby effectively grounding the base of the transistor 112 and inhibiting conduction by that transistor. When the camera 1 is selected, however, the resulting ground level of the C1 signal turns off the transistor 114. If the camera 1 is at that time connected and operating, the resulting positive voltage at the base of the transistor 112 causes conduction in that transistor 112 as described, and thereby prevents transmission of a SKIP signal from the skip detector 88. On the other hand if the camera 1 is not operating, the transistor 112 will, as described above, not conduct, thereby asserting the SKIP signal.

Referring back to FIG. 1, a series of eight panel lights in the form of light-emitting diodes L1 to L8 are connected to the output terminals of the decoder 64 so as to be turned on by the C1-C8 signals. Accordingly, by observing which of the lights L1-L8 is lit, the user immediately knows which camera is on line.

It will be seen from the foregoing, then, that the present sequential video switching system has several advantages which make it a particularly useful surveillance tool. It is constructed of standard digital components and, therefore, should be reliable and have a long, useful life with minimum maintenance. Further, it is quite flexible in that it can be operated manually using front panel controls or arranged for automatic operation, in which case the system automatically sequences through all of the active cameras in the installation. Furthermore, the camera dwell-time can be varied over a relatively wide time range to suit the needs of the particular user. Finally, no time or tape is wasted recording information at unused locations where surveillance is not needed or from a location whose camera is producing a useless signal. Rather the system rapidly advances to the next active camera in the sequence so that there is no likelihood of gaps in the surveillance record.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described.

I claim:

1. A video surveillance system comprising
    A. two or more video cameras, each camera generating a video signal corresponding to the scene viewed by that camera,
    B. means responsive to the video signals for reproducing the scenes viewed by the cameras,
    C. counter means for generating a sequence of counter signals, each signal corresponding to one of said video cameras,
    D. switching means connected between the cameras and the reproducing means for automatically applying the video signals from the cameras to the reproducing means in response to the counter signals for a selected time interval and in a selected sequence so that the reproducing means can reproduce the scenes viewed by said cameras during said time intervals and in said sequence,
    E. means for generating, in response to the counter signals, video signals representing the characters identifying the respective video cameras, and
    G. means whereby the reproducing means reproduce the camera identifying characters at a selected location in the reproduced scene.

2. The system defined in claim 1 and further including means for adjusting the intensity of the characters relative to the intensity of the scenes reproduced by the reproducing means.

3. The system defined in claim 1 and further including means for controlling the position of said character location in the scene reproducing means.

4. The system defined in claim 1 and further including manually operated means for controlling the switching means so that the video signal from any of the cameras is applied constantly to the reproducing means.

5. The system defined in claim 1 and further including indicating means responsive to the counter signals for indicating which camera video signal is being applied to the reproducing means at any given time in the sequence.

* * * * *